Aug. 29, 1961 H. R. SMITH, JR 2,998,376
HIGH-VACUUM EVAPORATOR
Filed Oct. 29, 1956 4 Sheets-Sheet 1

INVENTORS
BY HUGH R. SMITH, JR.
Lippincott & Smith
ATTORNEYS

INVENTORS
BY HUGH R. SMITH, JR.
*Lippincott & Smith*
ATTORNEYS

INVENTORS
HUGH R. SMITH, JR.
BY Lippincott & Smith
ATTORNEYS

United States Patent Office 2,998,376
Patented Aug. 29, 1961

2,998,376
HIGH-VACUUM EVAPORATOR
Hugh R. Smith, Jr., Berkeley, Calif., assignor to Temescal Metallurgical Corporation, Richmond, Calif., a corporation of California
Filed Oct. 29, 1956, Ser. No. 618,814
7 Claims. (Cl. 204—298)

This invention relates to improvements in apparatus for evaporating substances in a high vacuum at high temperatures.

Various metals, refractory materials such as quartz, and other substances may be evaporated in a high vacuum for various purposes, such as the preparation of thin or precisely controlled films and coatings, as is well known to those skilled in the art. Varying degrees of difficulty are encountered in the process depending upon the temperatures required and the chemical activities of the substances being evaporated as well as upon other factors. For example, some substances are so active chemically at the high temperatures required for their evaporation at reasonable rates that it is difficult to provide any crucible capable of holding the evaporating material. Where high temperatures must be employed, apparatus parts made of materials such as stainless steel may have sufficiently high vapor pressures to contaminate the evaporated substance.

Further difficulties may arise from the operating requirements of the process. For example, the production of films or coatings of precisely controlled thickness may require a precise control of the evaporation rate. In high-production processes, the evaporator may be required to operate without interruption for days at a time, which heretofore has not been generally possible. Furthermore, the apparatus must be reasonable in cost and economical in operation.

In some cases, such as the production of molecular beams, the hot vapor of the evaporating substance must be superheated to even higher temperatures.

Particular objects of this invention are to solve the foregoing and other problems encountered in difficult high-vacuum evaporation processes, but the improved apparatus is also useful in evaporation processes where the difficulties are less severe and the requirements are less stringent.

According to one aspect of this invention, the substance to be evaporated is held in a crucible and is heated by two separate electron-bombardment heating means. One of the two heating means heats the crucible from below, while the other heating means supplies additional heat to a portion of the evaporating substance without substantial further heating of the crucible. While electron-bombardment heating means have heretofore been used for heating evaporating substances either from above or from below, the novel combination of heating means herein disclosed provides significant and unusual advantages in the evaporation of hard-to-handle substances, in precisely controlling the rate of evaporation, in providing evaporators that can operate without interruption for long periods of time, and in the production of superheated vapors.

For example, some metals are so active chemically at high temperatures that they will attack any practicable material from which a crucible can be made. In general, the chemical activity increases very rapidly with increases in temperature, and relatively small increases in temperature may cause great increases in the tendency of the substance to attack the crucible. In accordance with the present invention, the crucible is heated from below sufficiently to cause substantial heating of the substance that is to be evaporated, but not sufficiently to cause rapid chemical action between the substance and crucible. The upper surface of the substance in the crucible is further heated by electron bombardment from above, so that a portion of substance in the crucible is brought to a higher temperature than the crucible itself, whereupon evaporation of the material proceeds at a satisfactory rate without serious chemical attack on the crucible.

From the standpoint of chemical attack on the crucible alone, all of the heat could be supplied by electron bombardment from above. However, significant advantages are obtained by supplying as much of the heat as possible from below. In particular, the heat supplied from below reduces the amount of heat that must be supplied by electron bombardment from above and thus permits the use of a smaller electrode structure and smaller leads disposed in the path of vapor rising from the upper surface of the evaporating substance. The smaller electrode structure intercepts less of the vapor, and this fact not only increases the efficiency of the system but also contributes greatly to the life of the electrode structure and makes possible for the first time evaporators capable of operating for days at a stretch without interruption while handling materials of high chemical activity at high temperatures.

Even with substances of low chemical activity, the use of two separate heating means as herein described is advantageous in many cases. For example, it makes possible a more accurate control of the evaporation rate. The lower heating means can be adjusted to bring the substance within the crucible substantially to evaporation temperature, and to supply most of the heat needed for evaporation. The upper heating means can then act as a trimmer for supplying quickly variable amounts of heat to the evaporating surface for accurate control of the evaporation rate. In another application the upper heating means heats a chimney through which the vapors pass for producing superheated vapor.

Other aspects of this invention relate to improvements in the two electron-bombardment heating means, which are useful whether the upper and lower heating means are used together or separately.

In accordance with one aspect of the invention, the crucible is fitted snugly into a relatively massive susceptor or heat distributor, and the lower heating means includes a filamentary cathode that supplies electrons bombarding a lower portion of the susceptor, so that the crucible is evenly heated and hot spots that might develop from direct electron bombardment of the crucible are avoided. Furthermore, since certain substances tend to seep through any crucible and susceptor that may be provided, the bottom of the susceptor is so shaped and the cathode is so placed that any such seeping material drips from the bottom of the susceptor without striking or damaging the cathode. These features are of great importance in providing an evaporator that can operate without interruption for days at a time while evaporating hard-to-handle substances.

Another feature of this invention relates to a novel construction of the upper heating means. A filamentary cathode disposed above the crucible consists of two parallel wires each having a substantially semi-circular outwardly bowed central lengthwise portion. The two outwardly bowed portions form a substantially circular horizontal cathode centered above the crucible. The two parallel wires are supported by horizontal rods connected to their ends, and electric current is supplied through the two wires in parallel for heating the filament to produce thermionic emission of electrons.

A particularly advantageous type of heating from above is achieved by regulating the electron current so that a plasma or glow-discharge region exists immediately above the evaporation surface, while a cloud of electrons forming a space-charge limited region surrounds the filamentary cathode.

All parts of the apparatus that are subjected to high temperatures are made of materials having low vapor pressures so that the evaporating substance will not be contaminated. Metal parts that must withstand high temperatures are made from materials selected from the group comprising tungsten, molybdenum, and tantalum. Non-metallic parts are made from graphite, carbides, refractory oxides of high purity, and borides. The use of chromium-bearing alloys such as stainless steel and the like is avoided for parts that must withstand high temperatures, although such materials may be used in supporting structures that are well shielded from excessive heat.

A better understanding of the invention will be had from the following detailed description of illustrative embodiments taken in connection with the accompanying drawings. In the drawings.

Figure 1:
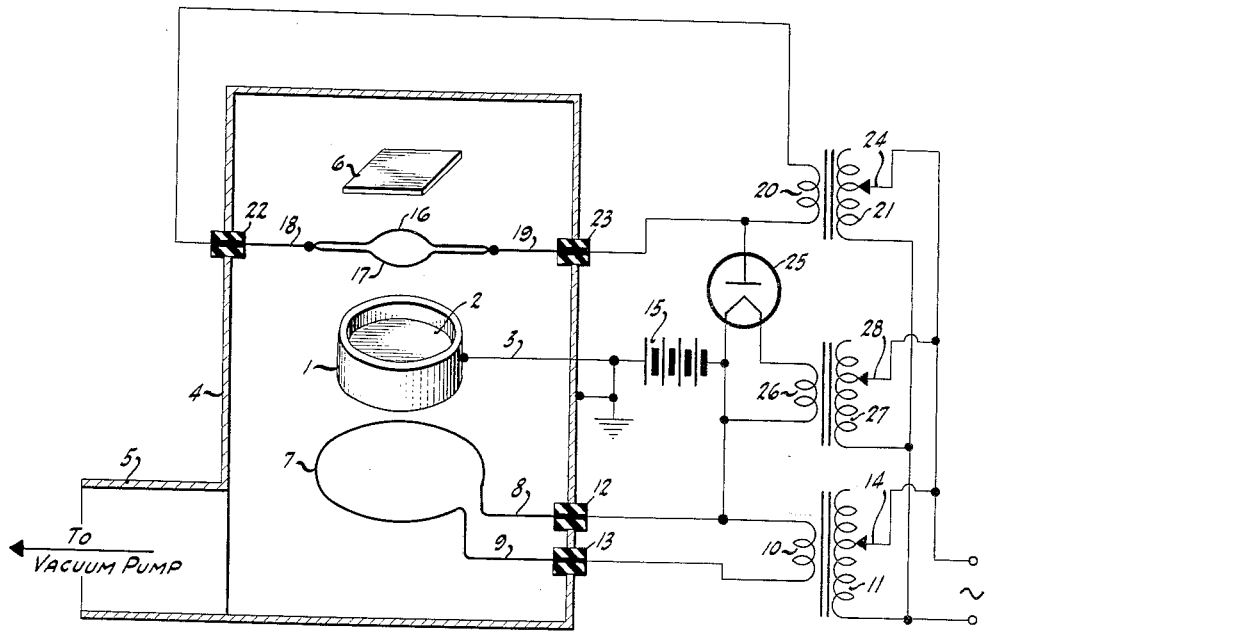
FIG. 1 is a greatly simplified schematic representation of vacuum evaporation and deposition apparatus.

Referring now to FIG. 1 of the drawings, an open-topped crucible 1 holds a substance 2 that is to be evaporated. The crucible is made entirely or in part of electrically conductive material, and is maintained at ground potential by grounded lead 3. The substance 2 is also electrically conductive, at least when it is heated to evaporating temperature, and through contact with the crucible substance 2 also is maintained at ground potential. The crucible is contained in a high-vacuum chamber 4 that is evacuated by connection through a passageway 5 to a conventional vacuum pump. As substance 2 evaporates, the vapor rises from the open-topped crucible, and it may be used for any purpose such as depositing a coating on a part 6 suspended in any suitable manner above the top of the crucible.

Electron bombardment means for heating the crucible and its contents from below includes a filamentary cathode 7 suitably spaced from a lower part of the crucible. Cathode 7 is heated by electric current applied thereto through leads 8 and 9 connected to the secondary 10 of a transformer having a primary 11 which may be connected to any suitable source of alternating current. Leads 8 and 9 pass through the walls of the vacuum chamber and are insulated therefrom by insulators 12 and 13. Suitable means such as the adjustable tap 14 on transformer primary 11 are provided for adjusting the amount of current through element 7.

Cathode 7 is maintained at a negative electric potential relative to crucible 1 by any suitable electric supply means, represented in the drawing by the battery 15 connected between ground and lead 8. The current through filament 7 heats the cathode sufficiently for thermionic emission of electrons, and the electrons bombard the crucible and heat the crucible and its contents. The rate of electron emission, and therefore the rate at which heat is supplied to the crucible by electron bombardment, can be adjusted by moving tap 14 to provide more or less current through filament 7. Because of the high voltage between crucible 1 and filament 7, large amounts of heat are produced by relatively small currents. Because the electron current is limited by cathode emission, as in a saturated diode, while filament current is kept to the minimum value for producing the required thermionic emission, the electrical efficiency is high and the filament is long lived.

Electron bombardment means for heating the evaporating substance 2 from above, includes a filamentary cathode comprising two parallel wires 16 and 17. Central lengthwise portions of wires 16 and 17 are outwardly bowed to form a horizontal substantially circular filament centered over crucible 1. Electric current is supplied through wires 16 and 17 in parallel by means of leads 18 and 19 and the secondary 20 of a transformer having a primary 21 which may be connected to the source of alternating current. Leads 18 and 19 extend through the walls of the vacuum chamber and are insulated therefrom by insulators 22 and 23. Means such as the adjustable tap 24 on primary 21 are provided for adjusting the amount of current through wires 16 and 17.

The upper cathode is maintained at a negative electric potential relative to crucible 1 and the substance 2 is contained therein by means of a current-limiting diode 25 connected between the negative terminal of battery 15 and lead 19, as shown. Diode 25 is a vacuum tube having a filament connected to the secondary 26 of a transformer having a primary 27 which may be connected to the alternating current supply. Means such as the adjustable tap 28 of primary 27 are provided for adjusting the amount of current through the diode filament. The diode normally operates at saturation, and therefore the amount of current that it transmits depends upon the temperature of its filament. This in turn is controlled by the position of tap 28. Since the electron current emitted by wires 16 and 17 for bombarding the vaporizing substance must pass through diode 25, the position of tap 28 regulates the electron current. The position of tap 24 adjusts the temperature of wires 16 and 17, which is usually made just sufficient to cause a thermionic emission rate somewhat greater than the electron current required for saturating diode 25.

With this arrangement a high-resistance discharge is maintained between upper cathode and the surface of the evaporating material, and a correspondingly high amount of power is delivered to the evaporating substance with relatively low electron current. Stability is assured by the current-limiting characteristics of diode 25. If a low-resistance vapor discharge occurs between the upper cathode and substance 2, the electron current is prevented from increasing substantially by diode 25, and the voltage between the upper cathode and substance 2 is suddenly greatly reduced. Consequently, the thermal power supplied to the surface of substance 2 from above is correspondingly reduced, and the formation of vapor is slowed sufficiently to permit a quick re-establishment of the high-resistance discharge.

Furthermore, the arrangement shown provides a convenient means for quickly and accurately controlling the evaporation rate. Whenever the position of tap 28 is altered the amount of current conducted by diode 25 quickly changes to a new value, and this causes a corresponding change in the electron current bombarding the surface of substance 2 from above. Thus the upper cathode can serve as a fast-acting trimmer or fine adjustment for adjusting the evaporation rate, while a major portion of the heat for evaporating substance 2 is supplied from below by the other heating means.

It should be understood that the discharges used for the heating purposes herein described are not necessarily entirely electronic in nature, but that they are essentially high-resistance discharges and not low-resistance electric arcs or the like. The upper discharge in particular may include a plasma or glow-discharge region, which is advantageous in concentrating the discharges onto the surface of evaporating substance 2. When operation first begins the electrons emitted from wires 16 and 17 may bombard the crucible as well as the substance within the crucible. However, as substance 2 begins to evaporate, the rising vapor permits the formation of an ionized plasma or glow discharge region immediately above the surface of the evaporating substance. This concentrates the discharge onto the evaporation surface, and at the same time distributes the discharge rather uniformly over the evaporation surface, so that the upper heating means heats the upper surface of substance 2 without materially raising the temperature of crucible 1. Furthermore, there is some desirable superheating of the rising vapor by the discharge through the plasma region.

However, the glow discharge region is not permitted to extend as far as the hot filament. If it did, the resistance between the filament and substance 2 would decrease and relatively large currents would be required to maintain the desired heat input. Furthermore, the filament would be damaged by ion bombardment. These undesirable results are prevented by limiting the electron current as hereinbefore explained. With a limited electron current, a drop in the resistance of the discharge reduces the amount of heat generated by the discharge, and this, in turn, reduces the rate of evaporation. Consequently, the vapor density is reduced sufficiently to re-establish a high-resistance discharge.

The filament current is adusted so that the temperature of wires 16 and 17 is somewhat higher than required for a thermionic emission rate that would just balance an electron current of the maximum magnitude permitted by diode 25. Consequently, a cloud of excess electrons surrounds the filament and provides a region of space-charge limited current. The potential of the filament automatically adjusts itself, by means of charges in the voltage drop across diode 25, so that the space-charge limited electron current has exactly the same value as the saturation current of diode 25. The cloud of electrons in the space-charge limited region tends to neutralize any positive ions that escape from the plasma and to minimize destructive bombardment of the filament by positive ions.

Figure 2:
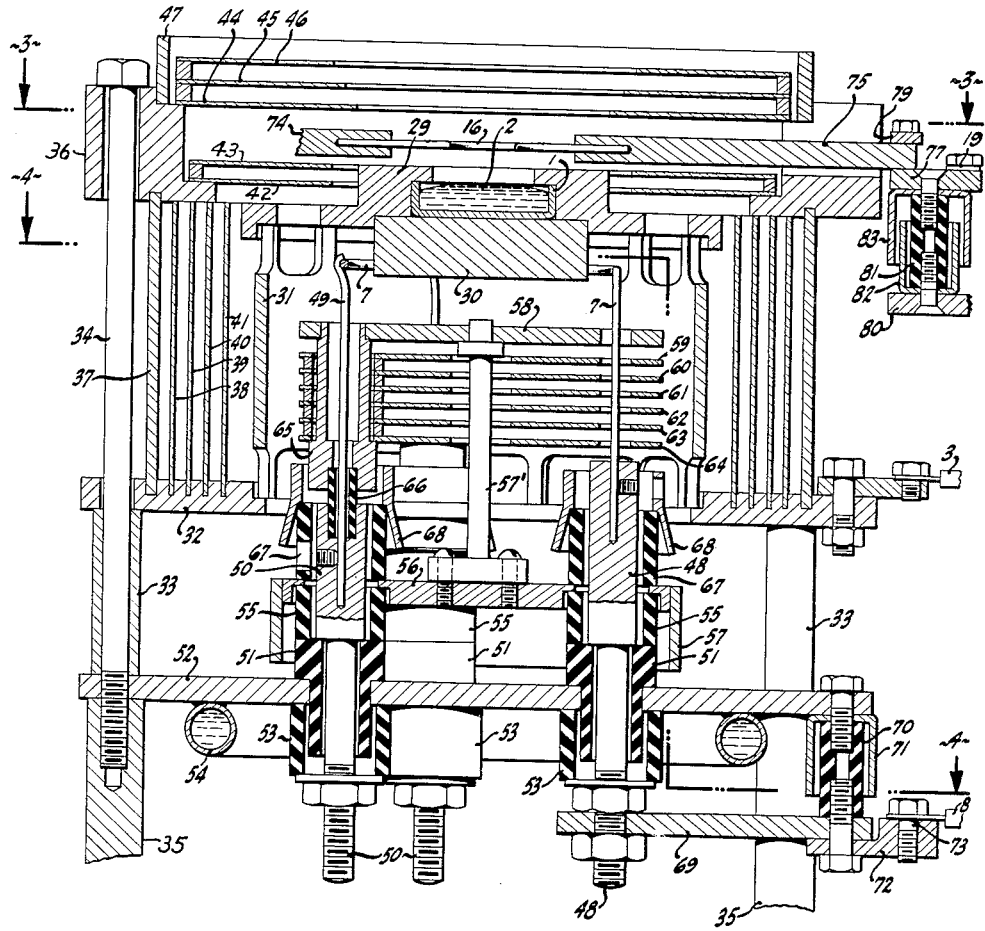
FIG. 2 is a vertical section of an improved evaporator.
Figure 3:
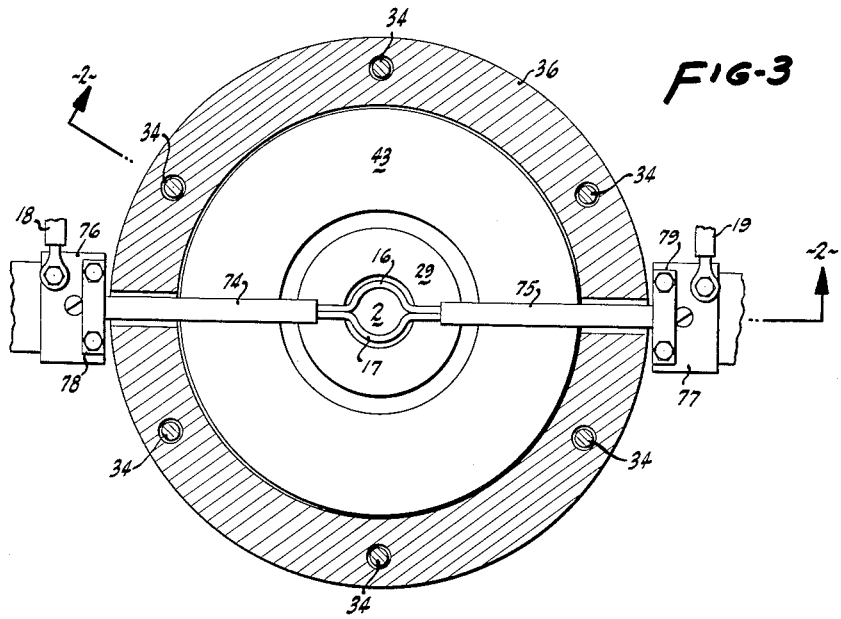
FIG. 3 is a section taken along the line 3—3 of FIG. 2, the plane of FIG. 2 being indicated in FIG. 3 by the line 2—2.
Figure 4:
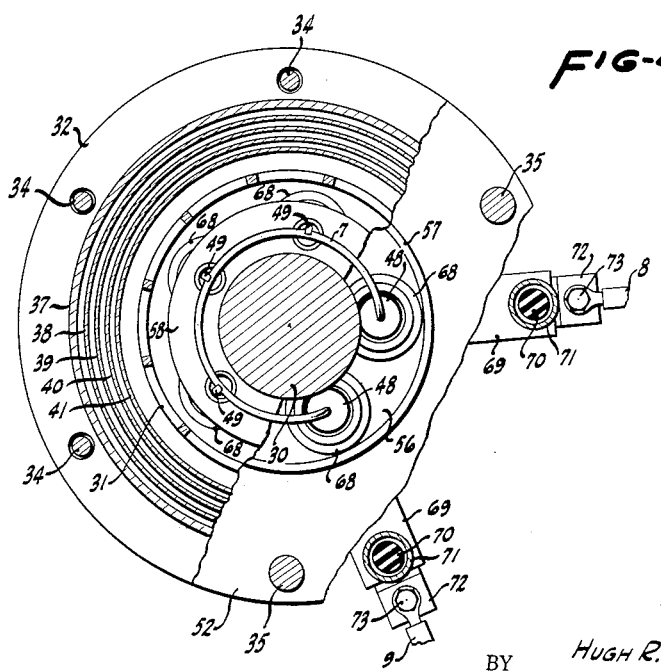
FIG. 4 is a section taken generally along the line 4—4 of FIG. 2.

The evaporator structure comprising the crucible and the two electron-bombardment heating means is shown in more detail in FIGS. 2 through 4. The thin-walled crucible 1 is made of a material that is resistant to chemical attack by the substance 2 that is to be evaporated. Direct electron bombardment of the crucible walls is apt to cause uneven heating and resulting thermal shock that may damage the crucible. To avoid this difficulty, crucible 1 is fitted snugly into a relatively massive graphite susceptor or heat distributor which, as illustrated in the drawing, may conveniently consist of two parts 29 and 30 fitting snugly together and substantially surrounding the crucible. An opening in part 29 is centered over the top of crucible 2 so that vapors of the evaporating substance can flow upward from the evaporator.

The rim of part 29 is supported on a graphite cylinder 31 which rests upon an annular graphite plate 32 that is supported in turn by a plurality of tubular supports 33 fitted on bolts 34 screwed into posts 35. Supports 33, bolts 34 and posts 35 are sufficiently removed from the high temperature that these parts may advantgeously be made of stainless steel. The edges of cylinder 31 are notched as shown, and the peripheral portion of part 29 has cut-out portions to reduce the flow of heat away from the high-temperature portions of the evaporator.

A graphite ring 36 is supported on top of a graphite cylinder 37 and held in place by bolts 34. A plurality of concentric cylindrical heat shields 38, 39, 40 and 41 are positioned between graphite cylinders 31 and 37 to reduce th transfer of radiant heat therebetween. A flange extending inward from the lower part of ring 36 supports discoid heat shields 42 and 43, while an upper portion of ring 36 supports discoid heat shields 44, 45, 46 within a graphite ring 47, as shown. All of the heat shields are preferably made of molybdenum because of its low vapor pressure at high temperatures.

Filament 7 extends around a lower peripheral portion of part 30 of the graphite susceptor or heat distributor, so that electrons emitted by filament 7 bombard part 30 for heating crucible 1 and its contents from below. This arrangement assures an even heating of crucible 1 and effectively prevents thermal shock which might damage the crucible. Because some evaporating substances may seep through the crucible and through the graphite heat distributor, the bottom of part 30 is made to extend below and inside of filament 7, so that any substances seeping through the heat distributor can drip through the bottom of part 30 without striking or otherwise damaging or endangering the filament 7.

Filament 7 preferably is made from a length of tungsten wire. Its two ends are bent downward and supported from a pair of titanium terminal posts 48. Intermediate points along the filament are supported by upright tungsten wires 49 that extend upward from posts 50 which may, if desired, be used as alternative electrical terminals. Posts 48 and 50 have shoulders resting on insulators 51 that extend upward from a horizontal plate 52. Cylindrical insulators 53 extending between the bottom of plate 52 and nuts screwed onto the ends of posts 48 and 50 hold the posts securely in place. Plate 52 is supported on posts 35, and it may be cooled by liquid circulating through tubing 54 brazed or otherwise attached to its under side.

Cylindrical insulators 55 rest on insulators 51 and support a horizontal plate 56. A skirt 57 is attached to the periphery of plate 56 and extends downward therefrom to protect the insulators 51 and 55 from vapor, which might otherwise condense thereon and produce electrical short circuits. A vertical post 57' is mounted on top of plate 56 and extends upward along the central vertical axis of the evaporator to assist in supporting a horizontal graphite plate 58 just below part 30 of the graphite heat distributor. Plate 58 catches substances that may seep through and drip from part 30, and also acts as a heat shield to impede the heat flow away from the high-temperature parts. Other heat shields 59, 60, 61, 62, 63 and 64, preferably discs of molydenum, are disposed below plate 58 as shown for further reduction of the downward heat flow from the high-temperature parts. Plate 58 is partially supported, and heat shields 59 through 64 are supported, by tubular supports 65 that rests upon insulators 66 extending upward from the tops of post 50, as shown. Cylindrical insulators 67 surround the upper portions of posts 48 and 50. A skirt 68 caps each of the insulators 67 for protecting the insulator from the condensation of the vapors thereon.

When electrically conductive materials such as metals are being evaporated, considerable attention must be given to insulator design if the evaporator is to operate for long periods without interruption, since any metallic vapor that condenses upon the insulators tends to produce electrical short circuits. The insulation system herein disclosed is particularly effective in this respect. It will be noted that critical parts of each insulator are shielded from the vapors, so that there is relatively little tendency for the vapors to condense upon the insulators. Furthermore, the arrangement is such that the shorting out of any one of the insulators near the high-temperature region will not by itself produce an electrical short circuit, since at least two of these insulators must be shorted to close any of the electrical circuits of the system. Other insulators, such as those directly associated with the input leads, are more remotely situated from the source of hot vapor and therefore are less subject to shorting by vapor condensation. Even in these cases, however, the placing of skirts around the insulators is a worthwhile precaution.

Electrical connections to the pair of terminal posts 48 are made through two copper bars 69 that are supported below plate 52 by insulators 70 which are protected by skirts 71. Copper terminal blocks 72 are attached to the outer ends of bars 70, and the flexible input leads 8 and 9 are connected thereto by any suitable means such as bolts 73.

Wires 16 and 17, which form the upper cathode, preferably are made of tungsten. Opposite ends of these two wires are inserted into horizontal tungsten rods 74 and 75 that support the filament wires and act as electrical connections thereto. Rods 74 and 75 extend outward through cutaway portions of ring 36, and are attached to terminal blocks 76 and 77, respectively, by means of cross-bars 78 and 79 and bolts, as shown. Flexible input leads 18 and 19 are connected to terminal blocks 76 and 77 for supplying electric current to the upper filament.

Terminal blocks 76 and 77 are supported in a similar manner, and therefore only the supporting parts for block 77 will be described in detail. A support 80 is attached to a wall of the vacuum chamber or other supporting structure. An upright insulator 81 extends upward from support 80 and supports terminal block 77 above support 80 in electrically insulated relation thereto. Insulator 81 is sufficiently close to the hot vapors produced by the evaporation of substance 2 that careful attention must be given to the protection of the insulator from vapor condensation. Accordingly, a metal shield 82 has a cup-like shape and extends upward from member 80 around but slightly separated from the insulator. A shield 83 is an inverted cup-like member of slightly larger diameter that extends downward from terminal block 77 around and slightly separated from shield 82. The two shields in combination are very effective in protecting the insulator from condensing vapor.

Figure 5:
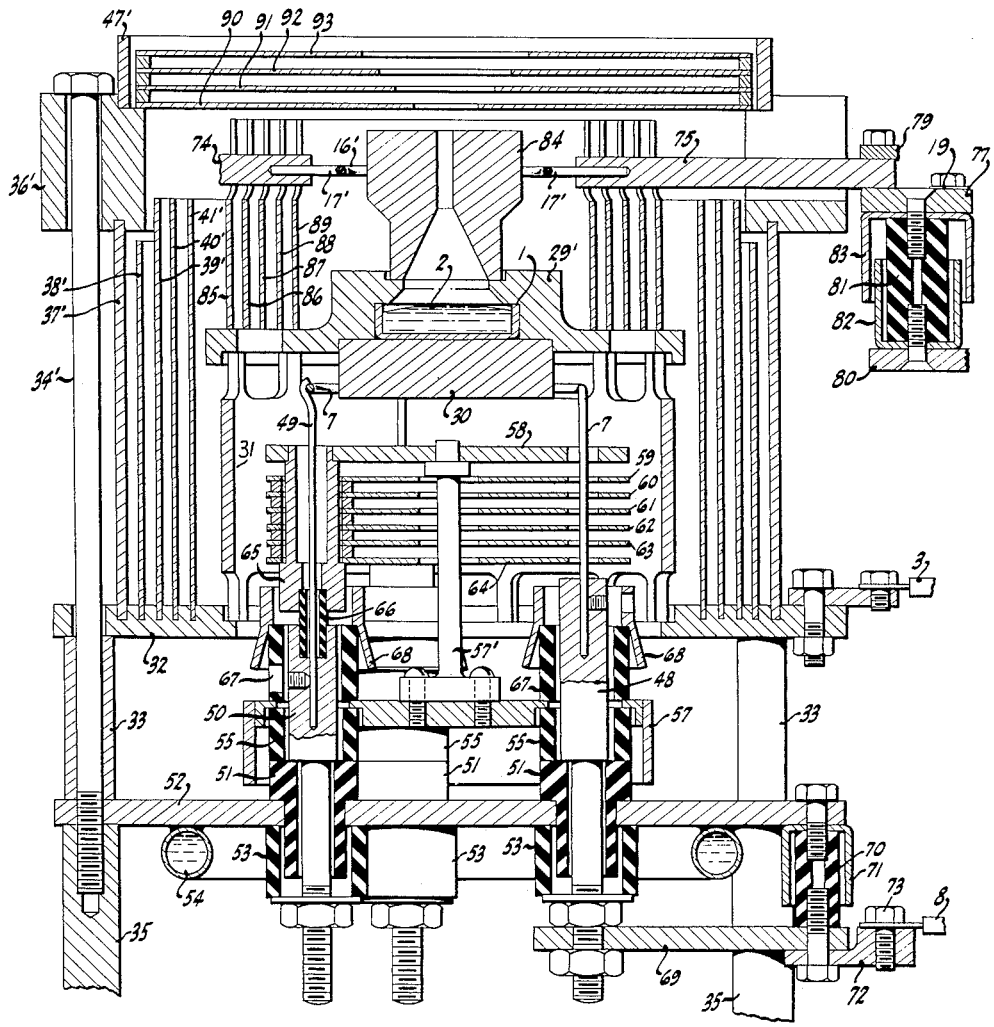
FIG. 5 is a vertical section of an evaporator for producing superheated vapors.

FIG. 5 illustrates a modification of the evaporator for producing superheated vapors or molecular beams. The essential difference between this embodiment and the embodiment hereinbefore described is that a graphite chimney or nozzle 84 has been placed above the crucible so that vapors from the evaporating substance 2 flow upward through chimney 84. The upper filamentary cathode, consisting of wire 16' and 17', is generally similar to the cathode consisting of wires 16 and 17 hereinbefore described except that wires 16' and 17' have been formed into a somewhat larger circle to provide more space for chimney 84, and the upper cathode has been moved upward somewhat so that now it bombards an upper portion of chimney 84 instead of bombarding the surface of the evaporating material inside the crucible.

Because of this upward movement of the upper cathode, it may be advantageous to modify the heat shield structure somewhat as shown. Graphite cylinder 37' is somewhat higher than the corresponding cylinder 37, and similarly heat shields 38', 39', 40' and 41' are somewhat taller than the corresponding heat shields 38, 39, 40 and 41. Additional upright cylindrical molybdenum heat shields 85, 86, 87, 88 and 89 rest upon the rim of part 29', as shown, which is generally similar to part 29 except for a slight modification in shape, particularly with respect to the size of the central opening which is somewhat smaller in FIG. 5 than in FIG. 2.

Four horizontal heat shields 90, 91, 92, and 93 are supported above the top of chimney 84 and inside of ring 47' by ring 36', as shown. The shape of ring 36' is slightly different from that of ring 36, and bolts 34' are slightly longer than bolts 34, to accommodate the changes in the heat shield structure. The lower heating structure is identical to that shown in FIG. 2, and therefore will not be described again.

The apparatus shown in FIG. 5 operates as follows: The lower cathode bombards part 30 of the heat distributor which electrons and heats crucible 1 and its contents from below. This heat then gradually vaporizes the substance contained within the crucible. The evaporation rate is controlled by adjusting the amount of thermal power supplied by the lower electron bombardment means.

The evaporating substance passes through crucible 1 upward through chimney 84. Chimney 84 is maintained at a higher temperature than crucible 1 by electron bombardment from the upper cathode. As the evaporating substance passes through the chimney, it is heated to a higher temperature and forms a superheated vapor or molecular beam, the distinction depending upon the density of the evaporating substance. The final temperature of this vapor can be adjusted by adjusting the power supplied by electron bombardment of chimney 84 by the upper cathode.

It should be understood that this invention in its broader aspects is not limited to specific embodiments herein illustrated and described, and that the following claims are intended to cover all changes and modifications that do not depart from the true spirit and scope of the invention.

What is claimed is:

1. High-vacuum evaporating apparatus comprising the following parts in combination: an open-topped crucible for holding a substance to be evaporated; means for heating said crucible from below to bring said substance to an elevated temperature; and electron bombardment heating means disposed above the top of said crucible for further heating portions of said substance to temperatures higher than that of said crucible.

2. High-vacuum evaporating apparatus comprising an open-topped crucible for holding a substance to be evaporated, a first electron bombardment means for heating said crucible from below to provide a major portion of heat supplied to said substance, a second electron bombardment means disposed above the top of said crucible for further heating evaporating portions of said substance to temperatures higher than that of said crucible, each of said electron bombardment means including a filamentary cathode, electric supply means for supplying heating current to each of said filamentary cathodes and maintaining each cathode at a negative potential relative to said crucible, means for regulating the electron current of said second electron bombardment means, and a high-vacuum chamber containing said crucible and said cathodes.

3. Apparatus for evaporating substances in a vacuum, comprising a thin-walled crucible for holding the substance to be evaporated, an electrically conductive heat distributor fitting snugly around said crucible, a first thermionic cathode spaced from said heat distributor in electron bombarding alignment therewith, electrical supply means for providing a negative potential at said first cathode relative to said heat distributor whereby said heat distributor is bombarded by electrons and said crucible is uniformly heated, a second thermionic cathode in electron bombarding alignment with the substance held by said crucible, and electrical supply means for providing a negative potential at said second cathode relative to said crucible, whereby portions of said substance are bombarded by electrons from said second cathode and heated to temperatures higher than the temperature of said crucible.

4. High-vacuum evaporating apparatus comprising the combination of a thin-walled crucible for holding the substance to be evaporated, said crucible being made of a material that is resistant to chemical attack by the substance, a graphite heat distributor, which is relatively massive as compared to said crucible, being fitted snugly around the crucible so that the crucible can be heated uniformly to avoid thermal shock which might damage the crucible, a substantially circular filamentary cathode extending around a lower side portion of the heat distributor for bombarding the heat distributor with electrons to heat the distributor, the crucible and the substance that is to be evaporated, the bottom of the heat distributor being smaller than and extending below the filamentary cathode, so that any substance that seeps through the crucible and the heat distributor drips from the bottom of the heat distributor without striking and without damage to the cathode, other heating means are disposed above the crucible for further heating portions of the substance to temperatures higher than that of the crucible, the crucible, heat distributor, cathode and other heating means being all contained within a high-vacuum chamber.

5. High-vacuum evaporating apparatus comprising a crucible for holding a substance to be evaporated, a thermally conductive solid heat distributor having an upper portion containing a recess and a lower portion with an electrically conductive outer surface, said crucible fitting snugly into the recess of said upper portion of said heat distributor, a thermionic cathode adjacent to said lower portion of said heat distributor, means for providing said cathode with a negative electric potential relative to said conductive surface so that electrons emitted by said cathode bombard and heat said lower portion of said heat distributor, whereby said crucible is uniformly heated from below, the bottom of said heat distributor being shaped with a lowermost part thereof out of vertical alignment with said cathode so that any substances dripping therefrom fall clear of said cathode, and a vacuum chamber containing said crucible, said heat distributor and said cathode.

6. High-vacuum evaporating apparatus comprising an open-topped crucible for holding the substance to be evaporated, a first filamentary cathode disposed above said crucible, said first cathode consisting essentially of two parallel wires each having a substantially semi-circular outwardly bowed central lengthwise portion, said two semi-circular portions substantially forming a horizontal circle centered over said crucible, a heat distributor fitting snugly around said crucible, a second filamentary cathode extending around a lower side portion of said heat distributor, the bottom of said heat distributor extending below and inside of said second cathode so that any substance seeping through said crucible and said heat distributor drips from the bottom of said distributor and safely clears said lower cathode, means for supplying heating current to both of said filamentary cathodes for producing thermionic emission of electrons therefrom, means for supplying said first cathode with a negative electric potential relative to said substance so that electrons from said first cathode bombard the upper surface of said substance and heat the same, means for supplying said second cathode with an electric potential that is negative with respect to said heat distributor so that electrons from said second cathode bombard said heat distributor and heat the same, said heat distributor uniformly heating said crucible and providing a major portion of the heat supplied to said substance, bombardment of said substance by said first cathode heating a portion of the same to a temperature higher than that of said crucible.

7. High-vacuum evaporating apparatus comprising a crucible for holding the substance to be evaporated, means for heating said crucible to evaporate said substance, a hollow tubular chimney disposed and extending vertically above said crucible so that the evaporated substance passes through the chimney, said chimney being of electronically and thermally conductive material, a filamentary cathode disposed around said chimney, means for supplying electric current to said cathode to heat the same and produce thermionic emission of electrons therefrom, and means for supplying said cathode with a negative electric potential relative to said chimney so that the electrons emitted by said cathode bombard the outer surface of said chimney and heat the same to a temperature higher than that of said crucible, whereby the evaporated substance passing through said chimney is superheated.

References Cited in the file of this patent

UNITED STATES PATENTS

| | | |
|---|---|---|
| 2,074,281 | Sommer | Mar. 16, 1937 |
| 2,100,045 | Alexander | Nov. 23, 1937 |
| 2,378,476 | Guellich | June 19, 1945 |
| 2,391,595 | Richards et al. | Dec. 25, 1945 |
| 2,527,747 | Lewis et al. | Oct. 31, 1950 |
| 2,665,320 | Chadsey et al. | Jan. 5, 1954 |
| 2,761,793 | Brennan | Sept. 4, 1956 |
| 2,887,413 | Ekkers et al. | May 19, 1959 |

FOREIGN PATENTS

| | | |
|---|---|---|
| 754,102 | Great Britain | Aug. 1, 1956 |